Patented Dec. 25, 1923.

1,478,429

UNITED STATES PATENT OFFICE.

WALTER FRIEDERICH, OF TREISDORF, NEAR COLOGNE, GERMANY.

PRIMER AND PROCESS OF MAKING SAME.

No Drawing. Application filed December 19, 1921. Serial No. 523,562.

*To all whom it may concern:*

Be it known that I, WALTER FRIEDERICH, a subject of the German Republic, and resident of Treisdorf, near Cologne, Germany, have invented certain new and useful Improvements in Primers and Processes of Making Same, of which the following is a specification.

This invention relates to the manufacture of primings or detonating compositions for military and mining purposes. It is already known to manufacture primer for Flobert and similar munitions and for percussion caps for fire-arms, guns and projectiles, the main constituent of which is the normal lead trinitroresorcinate $C_6H(NO_2)_3O_2Pb$. It has furthermore, already been proposed to load this normal lead trinitroresorcinate upon or to mix it with lead azide in order to obtain solid and yet sufficiently inflammable pressbodies in blasting cartridges. It has also been suggested to employ lead trinitroresorcinate in the same manner, as fulminate of mercury in combination with combustion-retarding agents for the manufacture of detonating fuses.

It has now been ascertained that basic lead salts of highly nitrated organic bodies can be obtained in well defined crystals and that these combinations are partly isomorphous with other salts or form double salts with them. It also happens that different crystals grow together or intermix promiscuously so that crystal powders are obtained which cannot be separated by mechanical means. Some of these salts excel the lead trinitroresorcinate in bursting power, some possess similar and others less bursting power. It is thus possible to regulate the bursting power to a certain extent and to adapt the primings or detonating compositions to the purpose for which they are intended. In this manner it is possible to obtain standard primings and to avoid the mechanical mixtures which it was hitherto necessary to prepare for special primings. The following may serve as examples of the basic lead salts of nitrated organic bodies. Basic lead picrate $C_6H_2(NO_2)_3$-OPbH or $(C_6H_2(NO_2)_3)_2O_2Pb$. PbO, the basic lead salts of the trinitrocresol the di- and trinitroresorcin, the trinitroresorcin, the hexanitre-diresorcine, the hexanitrodiphenylamine, the di- and tri-nitrobenzoic acid basic nitroacid salts as for instance basic dinitrobenzol nitroacid lead of the formula:

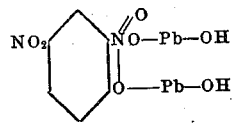

or

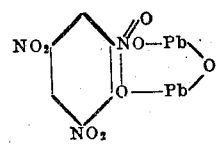

Further partly or multiple basic lead trinitrophloroglucinate, isomorphous or double salts of basic nitrobody salts with PbO or $Pb(OH)_2$, the basic lead salts of the tetranitrophenol, trinitroaminophenol and dinitroaminophenol of the dinitrobenzol or dinitrosobenzol, of the multiple nitrated naphthol and the mono- and trinitro-methane. Besides the substances mentioned numerous others may be employed. For the isomorphous intercrystallization the following may serve as examples: Basic or neutral hexanitrodiphenylamine lead with the neutral or basic salts of the picric acid, the trinitrocresol, the trinitroresorcin as well as the basic picrate with neutral lead trinitroresorinate.

The following may serve as examples for the production of the basic lead salts of nitrated organic bodies:

1. *Production of basic lead picrate.*

4.6 g. picric acid is dissolved in 40 ccm. normal soda lye (4% NaOH) with an addition of 160 ccm. water. This solution is allowed to drip into a solution of 7.5 g. lead nitrate in 300 ccm. water, heated to about 80°, during half an hour under vigorous stirring. The separation of the basic picrate takes place in the form of fine crystals suitable to be worked into primings. By reducing the temperature or increasing the concentration, it is possible to obtain finer crystals, while vice versa by an increase of the temperature or reduction of the concentration coarser crystals are produced.

2. *Production of basic hexanitrodiresorcinate of the formula:* $(C_6(NO_2)_3O_2)_2(PbOH)_4$.

2.4 g. hexanitrodiresorcine is dissolved in 200 ccm. water and during one hour allowed to drip into a solution of 10 g. lead acetate in 500 ccm. water heated to 95–100°, under vigorous stirring. In order to increase the output 20 ccm. normal sodium lye diluted to 100 ccm. may during one hour also be allowed to drip into the mixture.

3. Production of a mixed salt.

4.4 g. hexanitrodiphenylamine and 2.3 g. picric acid are brought into solution with 40 ccm. normal lye under an addition of 200 ccm. water and this solution is allowed to drip under stirring into a solution of 12 g. lead nitrate in 400 ccm. water during one hour.

All the products obtained in the above described manner are filtrated off, washed and dried at a moderate temperature when they are obtained in the form of a granulous crystalline powder. It could not at all have been anticipated that the basic lead salts and the mixed salts and double salts could be obtained in a form suitable for this object and would possess the necessary bursting power, easy inflammability and priming capacity, to serve as a primer for the various applications. These bodies may naturally also be employed mixed with the usual priming or detonating composition constituents. Most of them are extraordinary stable and may be stored in contact with metals like iron, zinc and aluminium for a long time without injurious effects. It is thus possible to mix them with aluminium, magnesium- and other metal-powders in order to increase the temperature of the flame, which in their employment in connection with percussion caps is an extremely advantageous feature, as owing to the great rise in the temperature of the explosion gases an excellent ignition of the main charge of gun powder or the like in the cartridges and the like is ensured. Many of the mentioned raw materials are easily obtainable and cheap in price, so that the exploitation of the invention is particularly easy and profitable.

It will be understood that I do not limit myself to the bodies stated by way of example or to the methods and proportions to their production, as other bodies and methods for their production may be employed within the ambit of the claims.

What I claim as my invention and desire to secure by United States Letters Patent is:

1. A priming comprising a constituent having the formula $(C_6(NO_2)_3O_2)_2(PbOH)_4$.

2. Basic hexanitrodiresorcinate having the formula, $(C_6(NO_2)_3O_2)_2(PbOH)_4$.

3. An improved process for making primers, comprising subjecting a solution of hexanitrodiresorcin to the action of a solution of lead acetate.

4. A process as in claim 3 the constituents being subjected to vigorous stirring at a temperature of from 95° C. to 100° C.

In testimony whereof I have signed my name to this specification in the presence of two subscribing witnesses.

DR. WALTER FRIEDERICH.

Witnesses:
 JOSEF STEINKRÜGER,
 ANTON NONN.